July 11, 1933.  J. E. GAEDE ET AL  1,917,707
FISHLINE BOBBER
Filed July 29, 1932
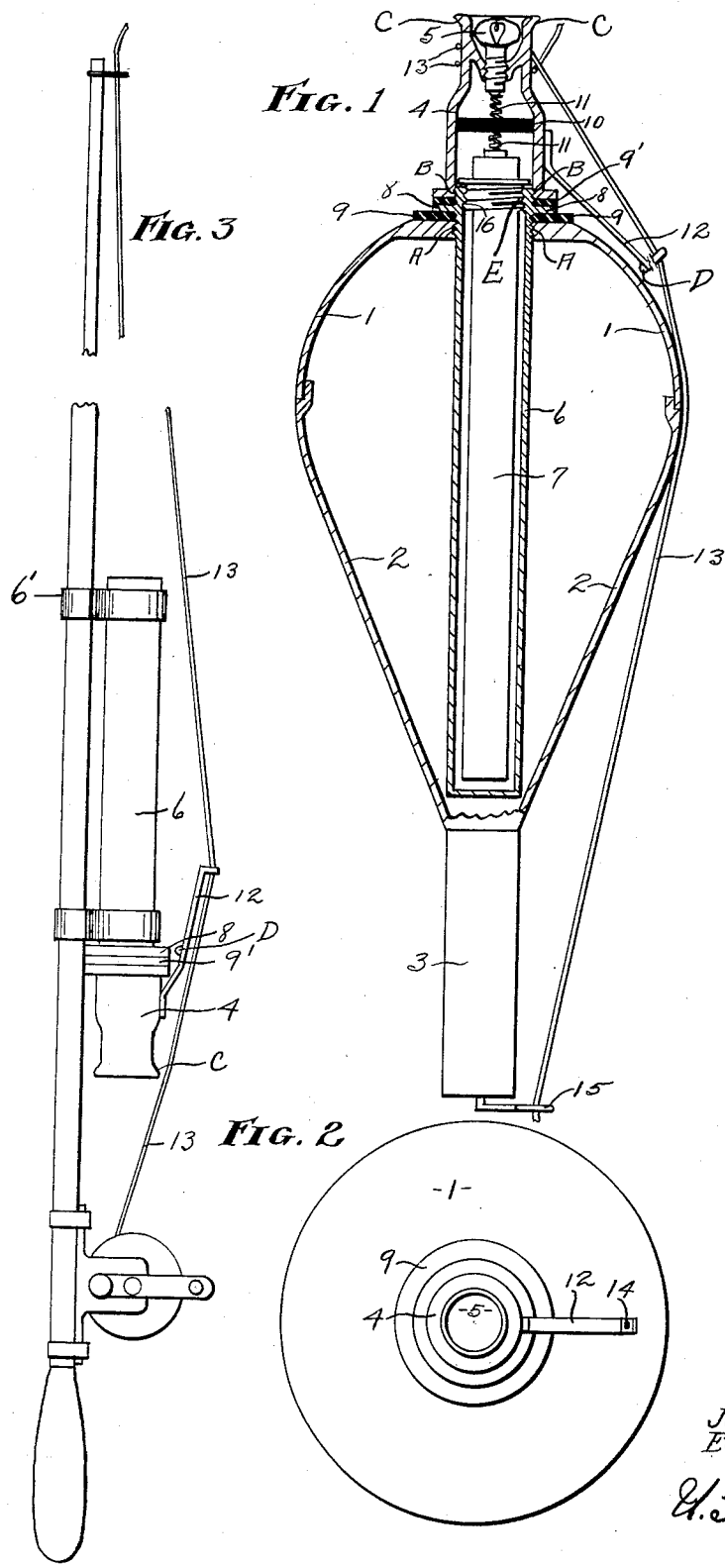
INVENTOR.
John E. Gaede
Edwin M. Sargent
H.G. Charles
ATTORNEY.

Patented July 11, 1933

1,917,707

UNITED STATES PATENT OFFICE

JOHN E. GAEDE AND EDWIN M. SARGENT, OF NEWTON, KANSAS; SAID GAEDE ASSIGNOR OF ONE-EIGHTH TO LINDA R. JANZEN, OF NEWTON, KANSAS

FISHLINE BOBBER

Application filed July 29, 1932. Serial No. 625,397.

Our invention relates to a floating bob for fishing line.

The object of our invention is to provide a bob subject to illumination by agitation of lighting means carried thereby.

A further object of our invention is to provide a floating bob having an electrical lamp and battery carried thereby, and means to make and break the current upon agitation by fish or the like working on the baited line.

A still further object of our invention is to provide a floating bob periodically visible in the dark through the medium of an electric lamp and battery contained therein, the circuit being closed by tension exerted on the line extending downward from the bob.

A still further object of our invention is to provide a hollow bob that is air tight as a buoyant means therefor regardless of the material employed whether it be of sheet metal or other substance impervious to water.

A still further object of my invention is to apply the spot light mechanism to a fishing pole.

These and other objects will hereinafter be more fully explained, reference being had to the accompanying drawing forming a part of this specification, and in which like characters will apply to like parts in different views.

Referring to the drawing:—

Fig. 1 is a side view partly in section for convenience of illustration.

Fig. 2 is a plan view of the top portion.

Fig. 3 is a view of a fragmentary portion of a fishing pole with a spot light attached thereto as a signal by illumination.

Our invention herein disclosed consists of a shell comprising a top hemispherical portion 1, and a lower frusto-conical portion 2 functioning as an air chamber when connected the lower frustum end of the conical portion is closed by a cylindrical extension 3 as a weight to vertically position the structure when placed in the water, the upper end in axially alignment with the structure as a receptacle 4 for an electric lamp 5 and in axial alignment therewith extending downward through the air chamber is a tubular container 6, in which is positioned a dry cell battery 7, the receptacle threadedly engaging in the shell as shown at A, the said receptacle has a flange 8 adjacent the said threaded portion and a threaded portion B on the outer side thereof on which the said lamp receptacle will threadedly engage. Between the flange and the shell is positioned a gasket 9 of flexible material as water-tight sealing means and a similar gasket 9' between the said flange and the lower end of the lamp receptacle. Positioned near the longitudinal center of the said lamp receptacle is an insulation element 10 functioning as fluid-tight sealing means and through which an electrode 11 extends, both ends of which are resiliently arranged, the upper end to contact with the said lamp 5 while the lower end snugly engages with the upper end of the battery, it being understood that the lamp receptacle is insulated from the shell containing the battery and has a switch 12 attached thereto that is flexible and the lower end of which is spaced a short distance from the shell, by which means the circuit is closed when the said switch is forced downward by the fish line 13 that engages through an aperture 14 in the outward end of the switch. It is understood that the said line is hitched around the lamp receptacle as shown and retained in position through the medium of flange C integral with the receptacle. The said line extends outward obliquely to engage in the said aperture and from thence obliquely downward passing through an apertured retainer 15 at the lower end of the bob and is free to slide therein. It is clearly shown how tension on the portion of the line extending downward from the bob when jerked or drawn by a fish will exert tension on the switch drawing the same in contact with the shell as at D, which immediately closes the circuit in the conventional way for illumination of the lamp, which is visible to the fisherman although the said lamp is placed well below the top end of its receptacle which is open, the purpose of which is to avoid attracting the fish by the light causing them to become shy. Being so arranged the fish while biting at the bait on a hook pendantly carried by the line extending downward from the bob, and is readily discerned in the dark or subdued light and furthermore, submersion of the bob will not hinder the function of the lamp.

In the arrangement and construction of our floating bob, we have considered the possibility of installing a fresh battery or blown lamp to be replaced without excess delay, all of which is readily accomplished and without detriment to the mechanism containing the same, and furthermore the battery, its container, the lamp, and its receptacle may be removed and joined together apart from the shell of the bob proper, functioning as a flashlight, and which has means to attach the same to a fishing pole through the medium of a pair of holders 6' frictionally engaging the pole and operative by a jerk on the line, as heretofore described.

It will be understood that the battery is equipped with a threaded sleeve 16 secured to the upper end thereof, to engage with the threaded upper end portion of the said container as at E. While we have shown and described a floating bob subject to illumination by certain manipulation the same general principle may be employed for other purposes such as, a buoy or the like and such modification may be employed as lie within the scope of the appended claims.

Having fully described our invention what we claim as new and desire to secure by Letters Patent is:—

1. In a floating bob for a fishing line, an air chamber having a cylindrical extension for the longer end thereof, a tubular container axially positioned in the air chamber and being attached thereto, a battery in the container, and means to retain the same therein, a receptacle for an electric lamp, a lamp and means to secure the same in the receptacle, an electrode positioned in the receptacle connecting the lamp and battery, a flexible switch carried by the receptacle and means to flex the same in contact with the shell.

2. In a floating bob for a fishing line, of the class described, comprising, a flanged lamp receptacle having an upper portion divided from the lower portion by an insulation member, an electrode carried by the member and extending outward from each side thereof, a tubular container threadedly engaging in the lower end of the receptacle, and a battery having a threaded sleeve to threadedly engage with the container and being in contact with the electrode, and means to retain an electric lamp in the container in contact with the electrode, and a switch to make and break the circuit, an air chamber in which the tubular container is insertable and means to secure the same together.

3. In a floating bob for a fishing line, of the class described comprising, an air chamber, a flanged tubular container threadedly engaging with the air chamber and having positioned thereon a receptacle threadedly engaging on the outer end of the said container, an electrode axially positioned in the receptacle and a lamp to engage therein, a threaded sleeve and a battery secured therein, the sleeve to threadedly engage with the said container when the battery is positioned therein, the battery and lamp being in contact with the electrode, a resilient switch attached to the receptacle and arranged to contact with the air chamber when forced thereto by a fish line cord, and means on the switch to retain a cord in working relation.

4. In a floating bob for a fishing line, of the class described comprising, an air chamber, hemispherical at one end and frusto-conical at the other, and a cylindrical member attached to the frustum of the chamber, an apertured retainer carried by the cylindrical member, a tubular member and a battery threadedly secured therein, and a lamp receptacle threadedly engaging on the tube, a lamp and means to partially enclose the same within the receptacle, and resilient means connecting the lamp and the battery, the receptacle having a flange on the outer end thereof, as a retaining means for a cord hitched to the receptacle, the switch having an aperture through which the cord will pass and also through the aperture of the said retainer for the purpose specified.

In testimony whereof we affix our signatures.

JOHN E. GAEDE.
EDWIN M. SARGENT.